(12) United States Patent
Chen

(10) Patent No.: US 8,636,429 B2
(45) Date of Patent: Jan. 28, 2014

(54) EASILY ADJUSTABLE TRIPOD

(76) Inventor: Qingyuan Chen, Yueqing (CN)

( * ) Notice: Subject to any disclaimer, the term of this patent is extended or adjusted under 35 U.S.C. 154(b) by 107 days.

(21) Appl. No.: 13/444,964

(22) Filed: Apr. 12, 2012

(65) Prior Publication Data

US 2013/0121680 A1    May 16, 2013

(51) Int. Cl.
*G03B 17/00* (2006.01)
(52) U.S. Cl.
USPC ............................................. 396/428
(58) Field of Classification Search
USPC ............................................. 396/428
See application file for complete search history.

(56) References Cited

U.S. PATENT DOCUMENTS

| 4,317,552 | A | * | 3/1982 | Weidler | 248/168 |
| 5,746,407 | A | * | 5/1998 | Nakatani | 248/178.1 |
| 6,445,498 | B1 | * | 9/2002 | Baun et al. | 359/430 |
| 2008/0224000 | A1 | * | 9/2008 | Yang | 248/188.5 |

FOREIGN PATENT DOCUMENTS

CN    200920109198.1    3/2010

* cited by examiner

*Primary Examiner* — Clayton Laballe
*Assistant Examiner* — Linda B Smith
(74) *Attorney, Agent, or Firm* — Maginot, Moore & Beck, LLP

(57) ABSTRACT

An easily adjustable tripod includes a main body, legs, a positioning piece, and a spring. The main body includes an adjustable connection part having protruding parts that function as gear teeth. Each leg includes a connector having two protruding side walls. The connector and the adjustable connection part are coupled with mounting screws. The positioning piece is coupled to the connector between the two protruding walls and meshes with the protruding parts on the adjustable connection part. The opening angle of the legs can be easily adjusted and fixed using the positioning piece and the adjustable connection part. The spring and the positioning piece are installed to form an organic whole, so the positioning piece can be conveniently adjusted without changing the opening angle after fixation. It is easy to close and fold the tripod because of the applied force of the spring.

2 Claims, 2 Drawing Sheets

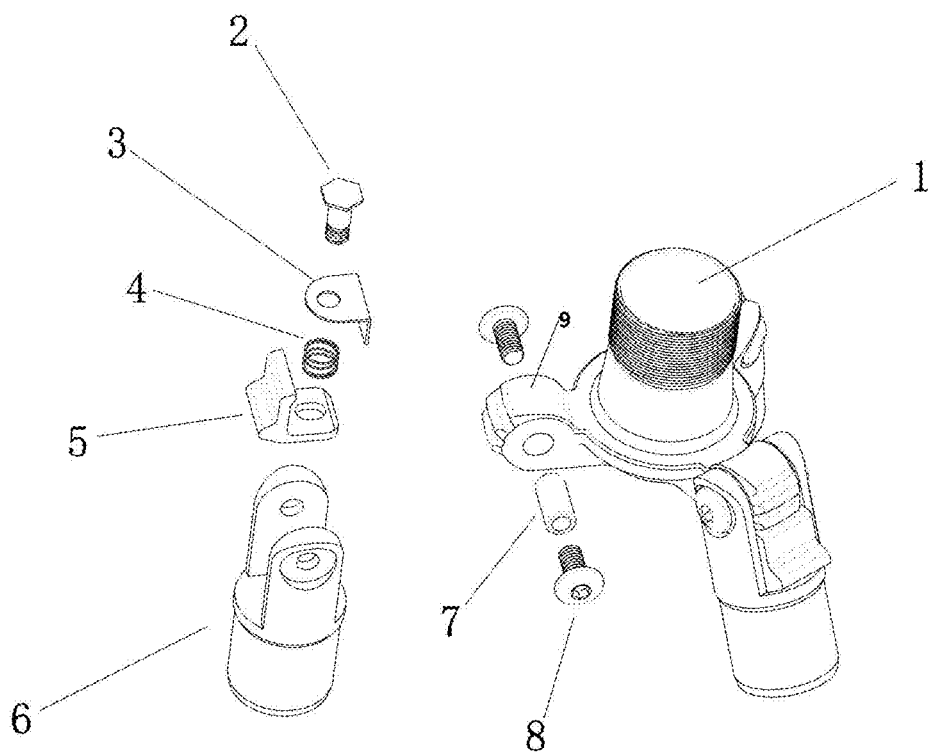
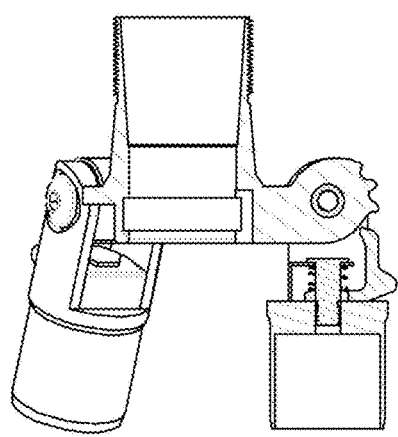
Figure 2a
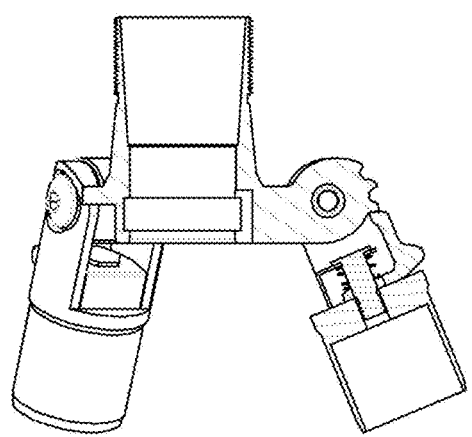
Figure 2b

EASILY ADJUSTABLE TRIPOD

TECHNICAL FIELD

This invention discloses an easily adjustable tripod in terms of its opening angle and falls within the category of photographic equipments.

TECHNOLOGY BACKGROUND

A tripod is one piece of auxiliary equipment commonly used in photography and camera shooting. To meet the requirements of different heights and environments, tripods capable of opening to different angles are needed. The tripods on market, are usually manual ones, i.e. the operator has to open the legs and press them into the earth to open them to an angle. The tripods with this structure are difficult to adjust and inconvenient to use. If the tripod needs to be opened to a larger angle or is expected to carry relatively heavy camera, the whole structure tends to be unstable and likely to loosen after being folded.

In view of the above mentioned problems, new technical solutions aimed at producing tripods that are easy to be opened and folded are being proposed. For example, the invention of Chinese Patent Number 200920109198.1 discloses an easily foldable tripod. The tripod of this invention has a torsional spring added into the subsystem that controls the opening angle of the legs. The torsional spring makes it possible for the legs to be folded. However, the torsional spring is independent of the subsystem that controls the opening angle of the legs, so it is easy for the torsional spring to drop off the tripod. Also, the position of the torsional spring relative to the leg tends to change after repeated use such that it becomes more difficult to control the opening angle of legs and fix the angle.

FIGURES

FIG. 1 is a diagram of the tripod mentioned in this invention.

FIGS. 2a, 2b, 2c and 2d are the schematic diagrams of the invented tripod in use.

DETAILED DESCRIPTION

Figure 2C:
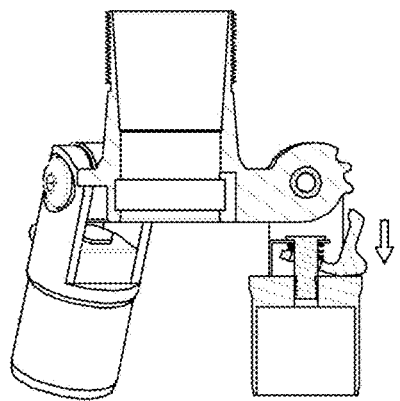

In view of the existing technical defects, this invention discloses a tripod wherein the angle is easy to adjust. It is convenient that the opening angle of the legs can be easily adjusted and once fixed, the angle can stay stable. On the other hand the tripod can be folded quickly and easily.

The invention fulfilling the above purpose is achieved by the technical proposal as follows:

The easily adjustable tripod is made up of a main body and legs, on the top of which there is a connector. An adjustable connection part on the main body and two protruding side walls on the top of the connector on the leg are connected by a mounting screw received within a screw hole on the connector. The adjustable connection part has protruding parts that function as gear teeth. On the two protruding side walls on the top of the leg connector, there is a rotatable positioning piece that can control the rotating angle of the legs. The positioning piece includes an extension with a concave surface, which enables the positioning piece to mesh with the protruding gear-like parts on the adjustable connection part. On the positioning piece there is a spring and the spring is covered with a block. The positioning piece and the spring block are fixed by a mounting screw received within a screw hole. A vertical facet of the spring block contacts a concave surface of the leg connector in a vertical direction.

There are five advantages of the tripod with such a structure. First, as the tripod is joined with screws, it is convenient to assemble. Second, because of the engagement between the positioning piece and the protruding gear-like parts on the adjustable connecting part, the angle of the legs is easily adjustable. Furthermore, because the spring is fixed with the positioning part and the spring's position is confined by the spring block, the angle of legs can be fixed such that there will be no observable relative displacement of the spring after repeated use. Relative displacement eliminates the possibility of accurate control of the opening angle. Fourth, since the vertical facet of the spring block is perpendicular to the concave surface of the legs throughout use, it is easy for a user to observe the opening angle of the legs and check if the position of the spring has changed and make some adjustment accordingly. Last, to fold the tripod, the acting force of the spring makes it an easier and an improved experience to close these legs.

Based on the above discussion, to make the positioning piece rotatable to adjust the opening angle, more than one feasible proposal has been put forward. For example, it is suggested that a smooth space be saved on the adjustable connecting part to hang the protrusions on the two sides of the leg, enabling the whole leg to rotate as a whole and be positioned by the positioning piece. However, the following structure is more preferred. A copper sleeve with internal through thread is positioned in the screw hole of the adjustable part, and the mounting screw is screwed in the copper sleeve with internal through thread.

For the tripod with the above structure, it is the copper sleeve with internal through thread that rotates, avoiding friction to the screw hole on the side wall of the leg and improving the service time of the screw.

The easily adjustable tripod disclosed by this invention is simple in structure and easy to assemble. The opening angle can be flexibly adjusted and firmly fixed and can be folded quickly and easily, thus improving the use experience of users.

PREFERRED EMBODIMENT

With the help of the figures, one can have a better understanding of the realization of the invention. However, this embodiment is only an example of the present invention as described in the figures, which is not meant to limit other embodies based on this invention. Replacement, adjustment of shape or length of parts by technicians based on the understanding of the technical proposal of the invention, still falls within the protected scope of the invention.

Referring to FIG. 1, the tripod includes a main body 1 and legs, on the top of which is the leg connector 6. An adjustable connection part 9 on the main body 1 and two protruding side walls on top of the leg connector 6 are connected by a mounting screw 8 received within a screw hole on the connector 6. The adjustable connection part 9 has protruding parts that function as gear teeth. On the two protruding side walls on top of the leg connector 6, there is a rotatable positioning piece 5 that can control the rotating angle of legs. The positioning piece 5 is an extension with a concave surface, which enables the positioning piece 5 to mesh with the protruding gear-like parts on the adjustable connection part 9. On the positioning piece 5 there is a spring 4, and the spring 4 is covered with a spring block 3. The positioning piece 5 and the spring block 3 are fixed by a mounting screw 2 received within a screw hole on the positioning piece 5. A vertical facet of the spring block 3 contacts a concave surface of the leg connector 6 in a vertical direction.

It is noted that the invention does not specify the material of the tripod. Any material commonly known as being feasible in this field, such as metal, plastic or alloy is allowed. However, considering the portability and quality, alloy is preferred.

Figure 2D:
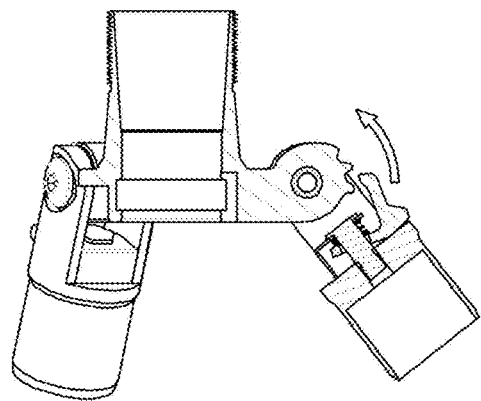

Referring to FIGS. 2a-2d, the tripod is shown in use. The spring has been confined within the confining structure made up of the spring block and the mounting screw throughout the use and normally speaking, no displacement or loosening would be observed, further improving the performance of the tripod.

What is claimed is:

1. A tripod capable of easy angle adjustment comprising:
   a main body including at least one adjustable connection part having protruding gear teeth and a screw hole;
   at least one leg connector for coupling with the adjustable connection part, the at least one leg connector having protruding side walls each of which has a screw hole, the at least one leg connector also having a mounting hole;
   at least one first mounting screw for coupling the at least one leg connector to the main body, the at least one first mounting screw being received within the screw hole in either of the protruding side walls and within the screw hole in the adjustable connection part;
   a positioning piece including an extension for engaging the protruding gear teeth on the adjustable connection part, the positioning piece also having a mounting hole;
   a spring block having a vertical facet and a mounting hole;
   a spring positioned between the spring block and the positioning piece; and
   a second mounting screw for coupling the spring block and the spring to the positioning piece, the second mounting screw being received within the mounting hole of the positioning piece and within the mounting hole of the spring block, bringing the vertical facet of the spring block into contact with the at least one leg connector.

2. The tripod of claim 1 further comprising a sleeve having internal threads, the sleeve being positioned within the screw hole of the at least one adjustable connection part for receiving the at least one first mounting screw therein.

* * * * *